(12) United States Patent
Kotrla

(10) Patent No.: US 7,410,019 B2
(45) Date of Patent: Aug. 12, 2008

(54) BRACKET ASSEMBLY FOR ALL-TERRAIN VEHICLE

(75) Inventor: Keith Kotrla, Newnan, GA (US)

(73) Assignee: Yamaha Motor Manufacturing Corporation of America, Newnan, GA (US)

(*) Notice: Subject to any disclaimer, the term of this patent is extended or adjusted under 35 U.S.C. 154(b) by 531 days.

(21) Appl. No.: 11/149,746

(22) Filed: Jun. 10, 2005

(65) Prior Publication Data

US 2006/0278462 A1 Dec. 14, 2006

(51) Int. Cl.
*B60K 11/04* (2006.01)

(52) U.S. Cl. .................. 180/68.4; 293/115; 296/205

(58) Field of Classification Search .............. 180/68.4, 180/68.6; 296/205, 78.1; 293/102, 105, 293/113, 115, 117
See application file for complete search history.

(56) References Cited

U.S. PATENT DOCUMENTS

| | | | | |
|---|---|---|---|---|
| 4,687,069 A | * | 8/1987 | Inomata et al. ............ 180/68.2 |
| 5,620,217 A | * | 4/1997 | Ichikawa et al. ............ 293/102 |
| 5,658,041 A | * | 8/1997 | Girardot et al. ........ 296/193.09 |
| 6,450,276 B1 | * | 9/2002 | Latcau ...................... 180/68.4 |
| 6,460,907 B2 | * | 10/2002 | Usui .......................... 293/115 |
| 6,682,096 B2 | * | 1/2004 | Kajikawa et al. ............ 280/797 |
| 6,715,573 B2 | * | 4/2004 | Emori et al. ............... 180/68.4 |

OTHER PUBLICATIONS

Yamaha brochure, 2005 Sport ATVs.
Yamaha brochure, 2005 Rhino 660 Automatic 4x4.
Yamaha brochure, 2005 Utility ATVs.

* cited by examiner

*Primary Examiner*—Christopher Ellis
*Assistant Examiner*—John D Walters
(74) *Attorney, Agent, or Firm*—Keating & Bennett, LLP

(57) ABSTRACT

An all terrain vehicle includes a body frame and a pair of brackets connected to the main frame. The all terrain vehicle also includes an air intake shroud, a pair of headlights, and an engine cooling apparatus, each of which is mounted directly to the pair of brackets.

16 Claims, 9 Drawing Sheets

BRACKET ASSEMBLY FOR ALL-TERRAIN VEHICLE

BACKGROUND OF THE INVENTION

1. Field of the Invention

The present invention relates to all-terrain vehicles. More specifically, the present invention relates to a bracket assembly upon which the air intake shroud, a pair of headlights, and an engine cooling apparatus of the all-terrain vehicle can be mounted.

2. Description of the Related Art

FIGS. 1A, 1B, and 1C illustrate a known all-terrain vehicle (ATV) 101. The ATV 101 includes a body frame 102 formed mostly of pipe members assembled by welding. An engine 125 is mounted on a middle portion of the body frame 102. Front wheels 120 provided with low-pressure tires, i.e., balloon tires, are suspended from front right and front left portions of the body frame 102. Rear wheels 121 provided with low-pressure tires are suspended from rear right and rear left portions of the body frame 102. The rear wheels 121 are supported on rear end portions of a swing arm 129 pivotally joined to a rear lower end portion of the body frame 102 for swinging motion in a vertical plane and supported by a suspension system 132. The front wheels 120 are supported by right and left linkages 130 individually connected to a front lower end portion of the body frame 102 and supported by shock absorbers 133 so as to be able to swing in a vertical plane. The handlebar 122 is operated to control the front wheels 120 for steering.

As shown in FIG. 1A, the front wheels 120 and the rear wheels 121 are driven through a transmission including drive shafts, not shown, and differential gears 134 and 135 by the engine 125 mounted on the body frame 102. Front fender 107 also encloses a pair of headlights 106. The handlebar 122, the fuel tank 124, and the seat 123 are arranged on the body frame 102 in that order from the front toward the rear of the body frame 102. A rear carrier rack 126 is disposed behind the seat 123 and is mounted on the rear fender 108.

The front wheels 120 are covered with front fender 107. The rear wheels 121 are covered with a rear fender 108. A cover 109 is provided on the body frame 102 between the front fender 107 and the rear fender 108 so as to surround the fuel tank 124. Exhaust pipes 136 extend rearward from the exhaust ports of the cylinders of the engine 125 and are connected to the muffler 127.

In the ATV 101, the pair of headlights 106 and the engine cooling apparatus 104 are attached to the body frame 102 of the ATV 101. Further, although not shown in FIGS. 1A and 1B, it is known to provide an air intake shroud for the engine cooling apparatus 104.

If the pair of headlights 106 are attached to the front fender 107 of the ATV 101 (as shown in FIG. 1B), then the front fender 107 must be reinforced in order to maintain the alignment of the optical axis of the of the headlights 106. A problem with this approach is that it results in the front fender 107 being heavy. Further, as the reinforced front fender 107 ages, the optical axis of the headlights 106 becomes misaligned.

If the headlights 106 are attached to the frame 102 of the ATV 101, then the headlights 106 need to be attached to the frame 102 in the same general location on the frame 102 as the engine cooling apparatus 104.

In addition, since the engine cooling apparatus and the air intake shroud are directly attached to the frame, assembly of the engine cooling apparatus and air intake shroud become more difficult and time consuming and are not easily removed for repair or replacement. Also, the arrangement of the engine cooling apparatus and air intake shroud when attached directly to the frame provide for inferior flow of air to the engine cooling apparatus and air intake shroud.

SUMMARY OF THE INVENTION

To overcome the problems described above, preferred embodiments of the present invention provide a bracket assembly that easily and reliably secures headlights, an air intake shroud and an engine cooling apparatus to a frame of a vehicle, while maximizing air flow to the air intake shroud and engine cooling apparatus, and ensuring accurate positioning of the headlights.

According to a preferred embodiment of the present invention, a vehicle includes a body frame, and at least one bracket connected to the main frame, wherein at least two of the following an air intake shroud, a pair of headlights, and an engine cooling apparatus, are mounted directly to the at least one bracket.

In another preferred embodiment, each of the air intake shroud, the pair of headlights, and the engine cooling apparatus is mounted directly to the at least one bracket.

The engine cooling apparatus is preferably mounted at a front portion of the at least one bracket so as to be located at a front of the vehicle.

The engine cooling apparatus, such as an air-cooled radiator or an oil or fluid cooled apparatus, is also preferably mounted on the at least one bracket so as to be substantially vertically arranged in the vehicle.

The at least one bracket preferably includes a first portion for attachment to the main frame, and a second portion attached to the first portion for mounting the at least two of the pair of headlights, the air intake shroud, and the engine cooling apparatus to the at least one bracket, the second portion being located forward of the first portion toward a front of the vehicle.

In another preferred embodiment of the present invention, a pair of the brackets extends from the body frame toward a front of the vehicle.

Each of the pair of brackets preferably includes at least one arm, the engine cooling apparatus being mounted between the at least one arm of the pair of brackets and each of the pair of headlights being mounted on a respective one of the pair of brackets outside of the engine cooling apparatus.

Also, each of the pair of brackets preferably includes top, medial, and bottom arms. The engine cooling apparatus is preferably mounted to the top and bottom arms of the pair of brackets, the air intake shroud is mounted to the bottom arms of the pair of brackets, and each of the headlights is mounted to the top and medial arms of a respective one of the pair of brackets.

According to another preferred embodiment of the present invention, a method of assembling a vehicle includes the steps of providing a body frame, providing at least one bracket, mounting the at least one bracket to the body frame, and fixing at least two of an air intake shroud, a pair of headlights, and an engine cooling apparatus directly to the at least one bracket.

The step of fixing preferably includes fixing each of the pair of headlights, the air intake shroud, and the engine cooling apparatus directly to the at least one bracket.

The at least one bracket preferably includes a first portion for attachment to the main frame, and a second portion attached to the first portion for mounting the at least two of the pair of headlights, the air intake shroud, and the engine cooling apparatus to the at least one bracket, the second portion being located forward of the first portion toward a front of the vehicle.

In another preferred embodiment, the step of providing at least one bracket includes providing a pair of the brackets and arranging the pair of brackets such that each of the pair of brackets extends from the body frame toward a front of the vehicle.

The engine cooling apparatus is preferably fixed to the pair of brackets at a front portion thereof so as to be located at a front of the vehicle. Also, the engine cooling apparatus is preferably mounted on the pair of brackets so as to be substantially vertically arranged in the vehicle.

Each of the pair of brackets preferably includes at least one arm, the engine cooling apparatus being mounted between the at least one arm of the pair of brackets and the pair of headlights being mounted on the pair of brackets outside of the engine cooling apparatus.

In one preferred embodiment, the step of fixing is performed before the step of mounting.

In another preferred embodiment, the step of mounting is performed before the step of fixing.

Each of the pair of brackets preferably includes top, medial, and bottom arms, and the engine cooling apparatus is preferably mounted to the top and bottom arms of the pair of brackets, the air intake shroud is preferably mounted to the bottom arms of the pair of brackets, and each of the headlights is preferably mounted to the top and medial arms of a respective one of the pair of brackets.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 5:
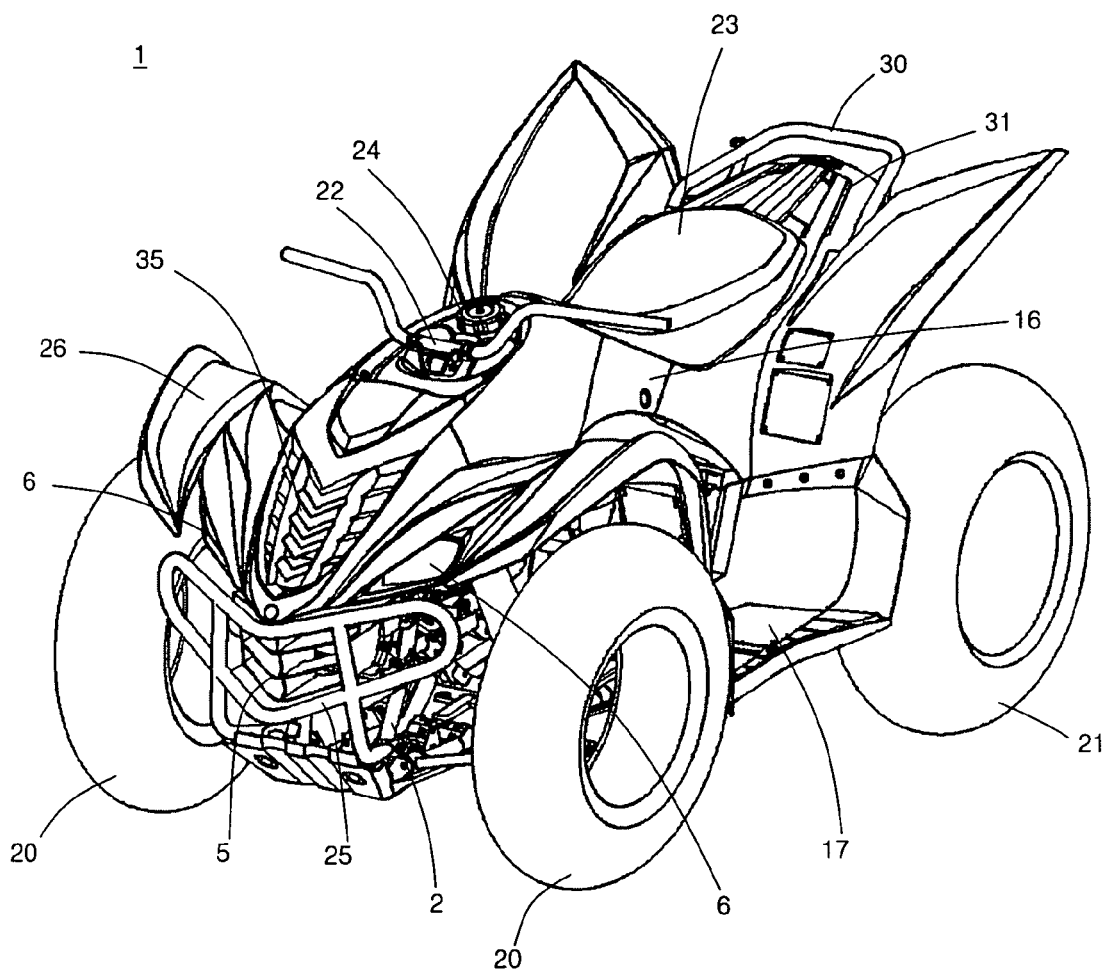
FIG. 5 is an isometric view of an ATV according to a preferred embodiment of the present invention.

FIG. 5 illustrates ATV 1 according to a preferred embodiment of the present invention. The ATV 1 includes a pair of front wheels 20 and a pair of rear wheels 21 (only one rear wheel is shown in FIG. 5).

The ATV 1 includes handlebars 22 for steering the front wheels 20. A substantially V-shaped front carrier bar 25 is connected the body frame 2 of the ATV 1. Directly behind the substantially V-shaped carrier bar 25 is an air intake shroud 5 for directing airflow to the engine cooling apparatus (not shown). The front fender 26 is located above the air shroud 5 and includes a grill 35. The ATV 1 also includes a pair of headlights 6 that are located next to the front fender 26.

Fuel tank 24 is located next to the handlebars 22. The seat 23 is located behind and adjacent to the fuel tank 24. The rear carrier bar 30 and the rear fender 31 are located at the rear of the ATV 1, behind the seat 23. The rear fender 31 and front fender 26 are connected by cover 16. Also, foot rests 17 are connected to the front fender 12 and the rear fender 3 on both sides of the seat 23.

Figure 1A:
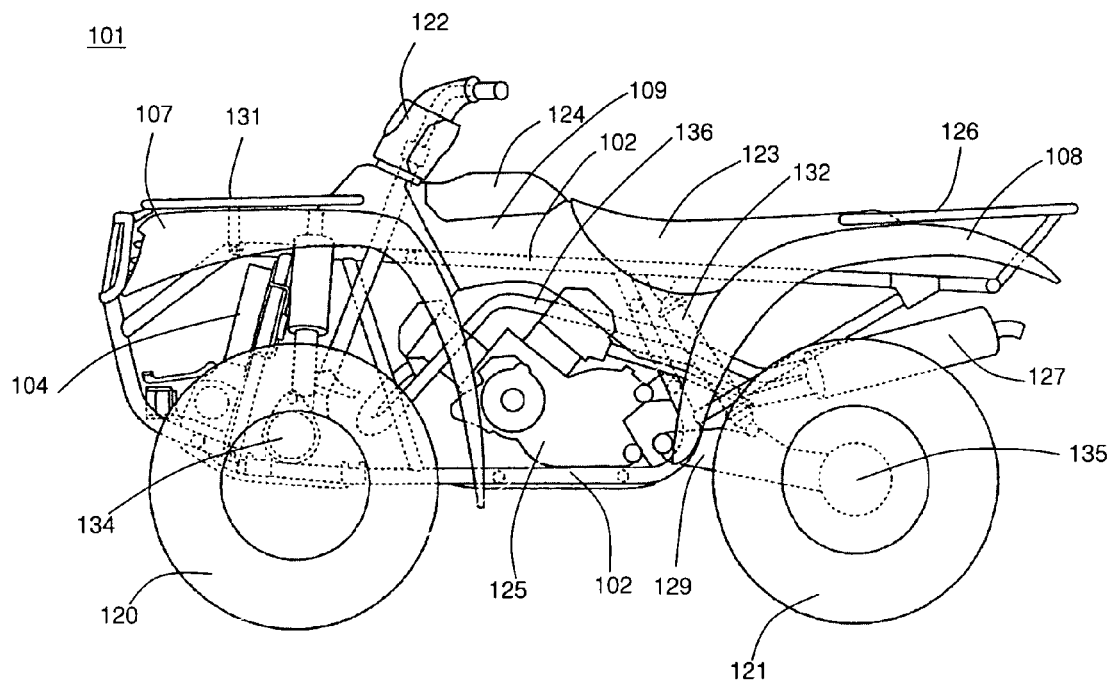
FIG. 1A is side view of a known ATV.
Figure 1B:
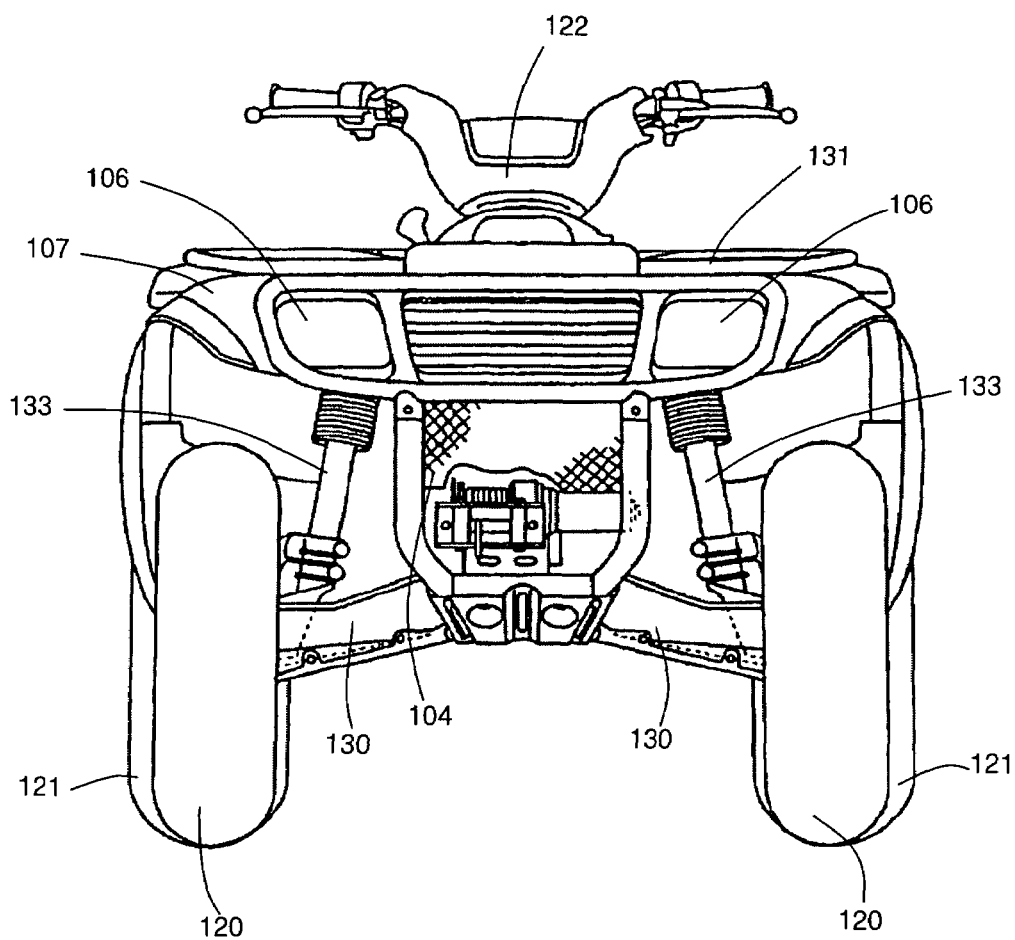
FIG. 1B is front view of a known ATV.
Figure 1C:
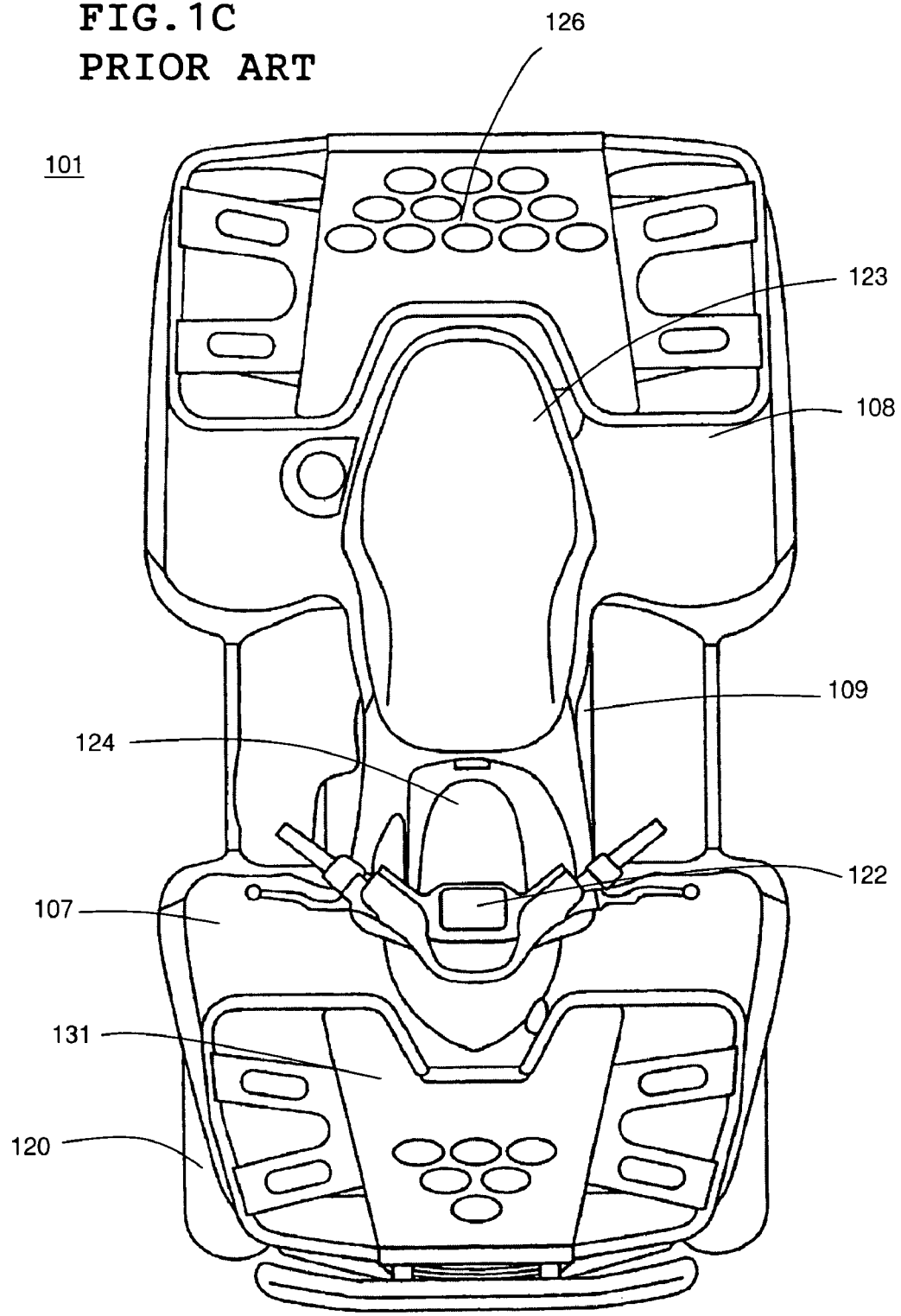
FIG. 1C is top view of a known ATV.
Figure 2:
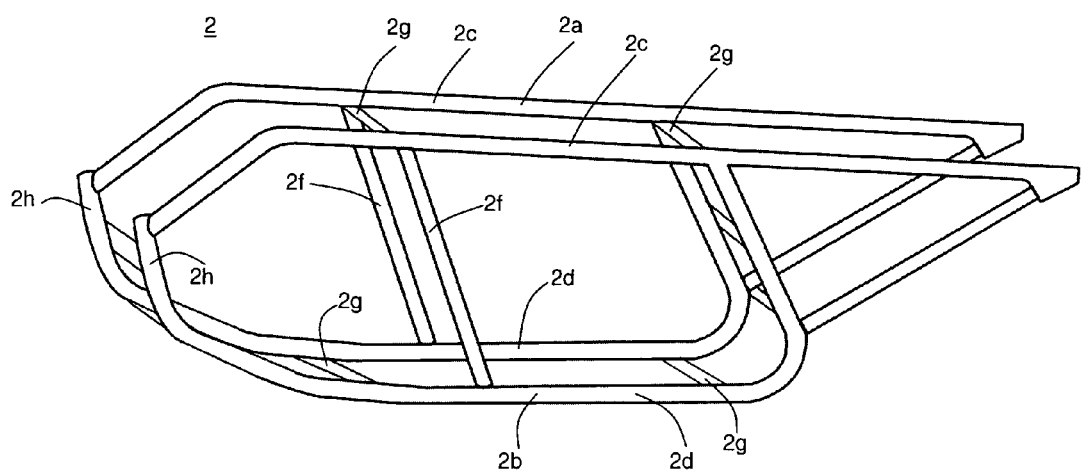
FIG. 2 is an isometric view of the body frame before the brackets, the air intake shroud, the pair of headlights, and the engine cooling apparatus are attached, according to a preferred embodiment of the present invention.

As shown in FIG. 2, a body frame 2 is built by welding together pipe members preferably having a substantially circular cross section. The body frame 2 includes a right side frame 2a and a left side frame 2b. Each of the right 2a and left 2b side frames has an upper frame member 2c and a lower frame member 2d that are connected to each other by cross members 2f. The right 2a and left 2b side frames are connected to each other by a plurality of lateral cross members 2g. The right 2a and left 2b side frames also include front frame members 2h. The particular shape and arrangement of the body frame 2 shown in FIG. 2 is not important. The body frame 2 could have any suitable shape or arrangement.

Figure 3A:
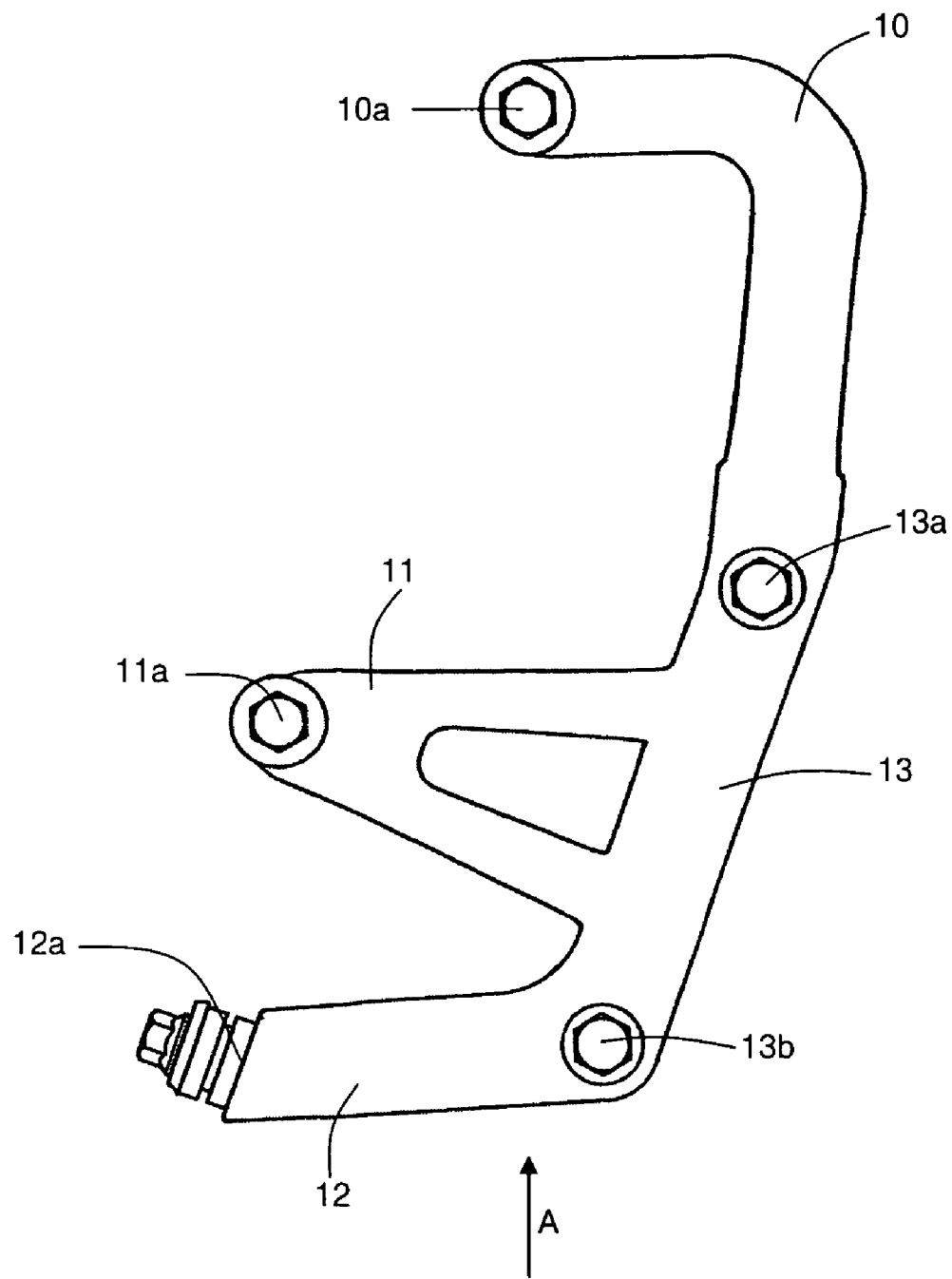
FIG. 3A is a side view of a bracket before the air intake shroud, the pair of headlights, and the engine cooling apparatus are attached, according to a preferred embodiment of the present invention.
Figure 3B:
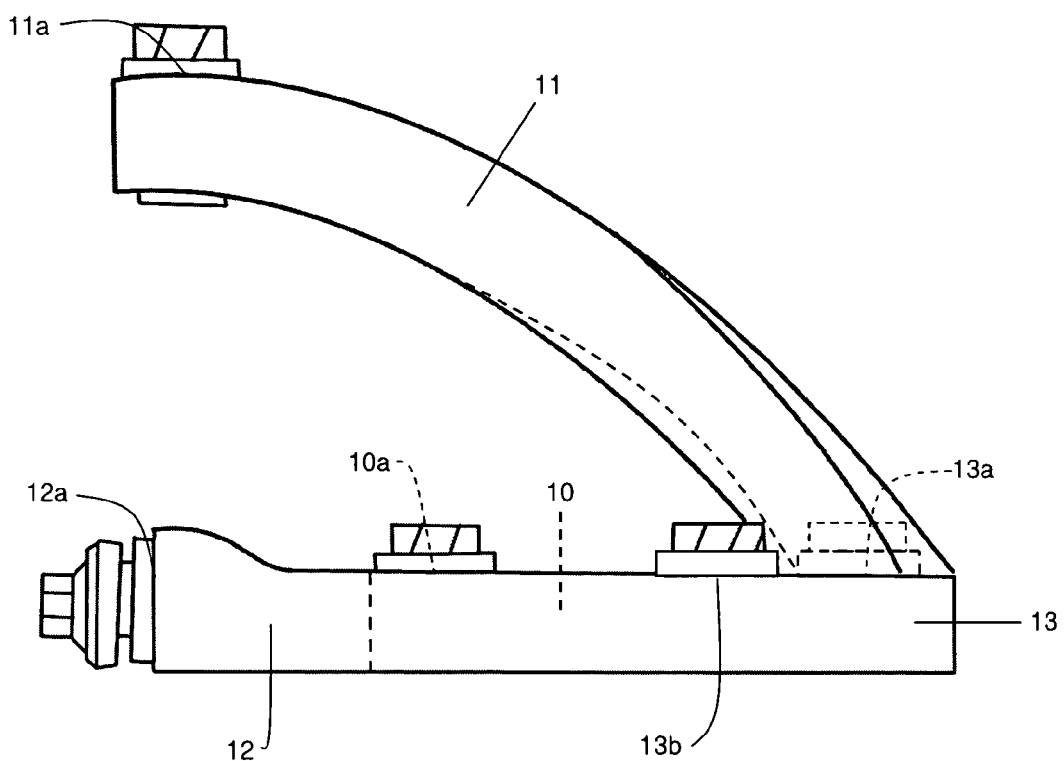
FIG. 3B is a view of a bracket in the direction of arrow A before the air intake shroud, the pair of headlights, and the engine cooling apparatus are attached, according to a preferred embodiment of the present invention.

FIGS. 3A and 3B show one of brackets 3 before it is assembled with the air intake shroud 5, the pair of headlights 6, and the engine cooling apparatus 4. Preferably, two of the brackets 3 are attached to the body frame 2, one on the front frame members 2h on the right side frame member 2a and the other on front frame members 2h on the left side member 2b.

The bracket 3 includes base portion 13. The base portion 13 of the bracket 3 may be connected to front frame members 2h by nuts and bolts through attachment holes 13a and 13b. Further, any other suitable method of attachment could also be used to attach the base portion 13 of the bracket 3 to the body frame 2.

The bracket 3 includes a top arm 10, a medial arm 11, and a bottom arm 12 that extend from the base portion 13. The top arm 10, the medial arm 11, and the bottom arm 12 are arranged such that the medial arm 11 is not in the same plane defined by the top arm 10, the bottom arm 12, and the base portion 13. As shown in FIG. 3B, the medial arm 10 may extend from the plane defined by the top arm 10, the bottom arm 12, and the base portion 13 in an arcuate manner. When the bracket 3 is attached to the body frame 2, the top arm 10, the medial arm 11, and the bottom arm 12 extend away from body frame 2 of the ATV 1 towards the front of the ATV 1.

The top arm 10 and the medial arm 11 include holes 10a and 11a, respectively, and the bottom arm 12 includes a bracket 12a for attaching the air intake shroud 5, the pair of headlights 6, and the engine cooling apparatus 4, respectively (not shown in FIGS. 3A and 3B).

Figure 4A:
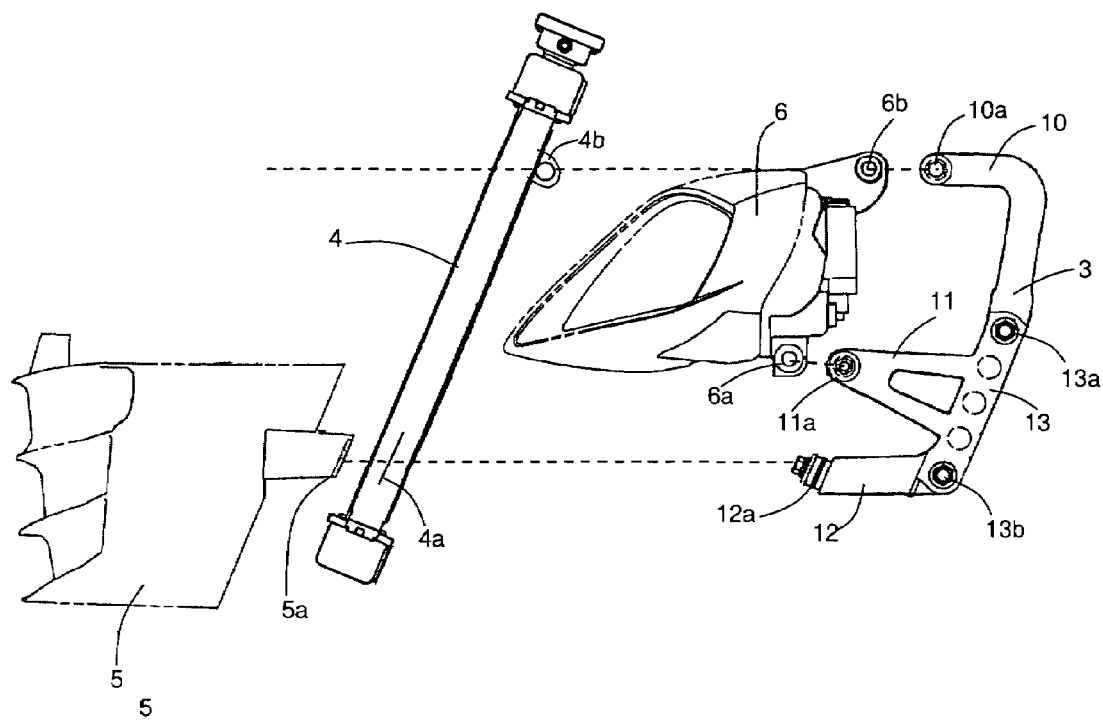
FIG. 4A is an exploded view of the pair of brackets with the air intake shroud, the pair of headlights, and the engine cooling apparatus attached, according to a preferred embodiment of the present invention.
Figure 4B:
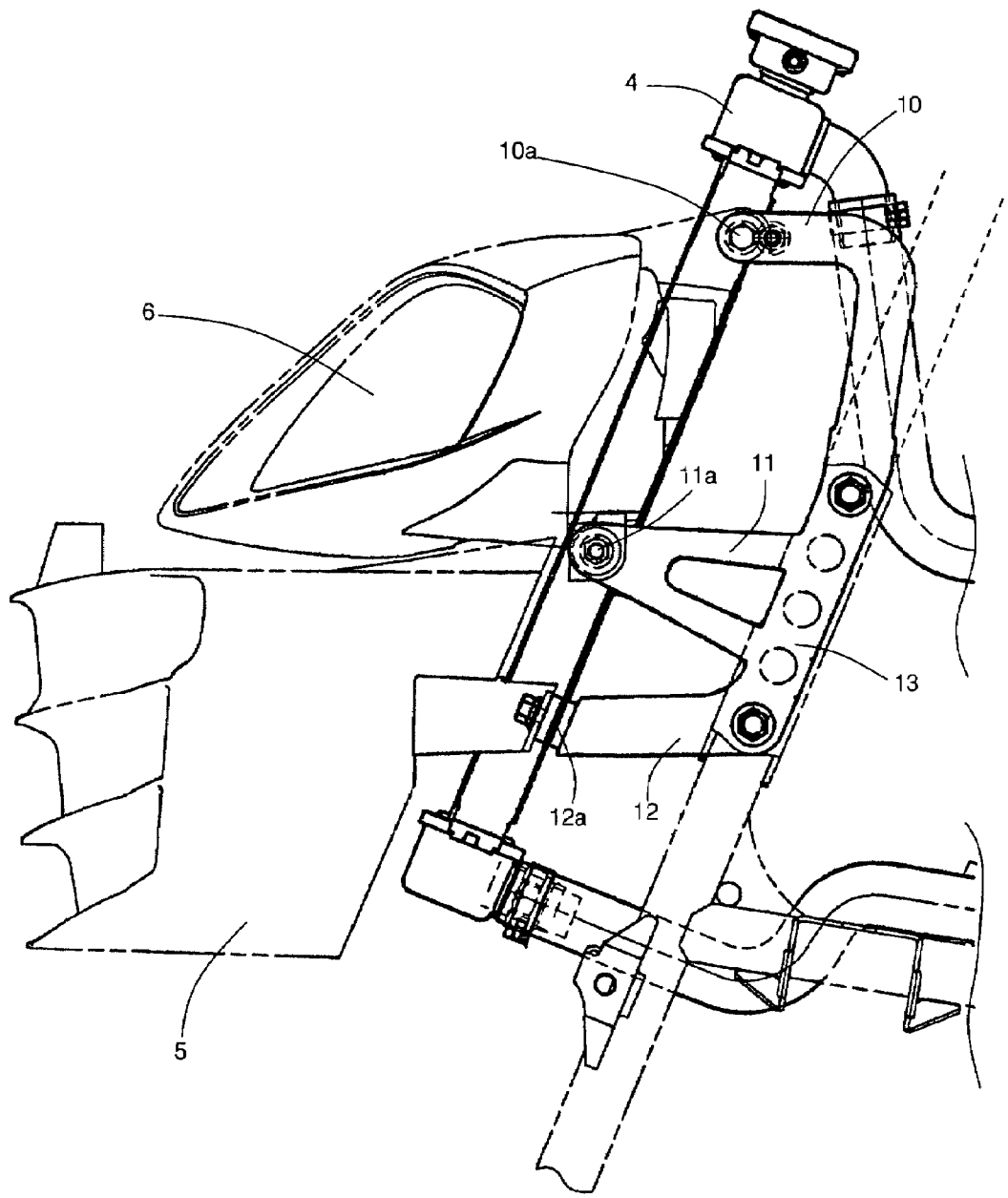
FIG. 4B is a side view of the pair of brackets assembled with the air intake shroud, the pair of headlights, and the engine cooling apparatus attached, according to a preferred embodiment of the present invention.

FIGS. 4A and 4B show the assembly of the brackets 3 with the air intake shroud 5, the pair of headlights 6 (only one headlight is shown in FIGS. 4A and 4B), and the engine cooling apparatus 4. The top brackets 4b (only one of the top brackets 4b is shown in FIGS. 4A and 4B) of the engine cooling apparatus 4 are connected to the hole 10a of the top arms 10 and the bottom brackets 4a (only one of the bottom brackets 4a is shown in FIGS. 4A and 4B) of the engine cooling apparatus 4 are connected to the bracket 12a of the bottom arms 12 of a pair of brackets 3 (only one bracket is shown in FIGS. 4A and 4B). Top bracket 6b of each headlight 6 (only one of the headlights 6 are shown in FIGS. 4A and 4B)

is connected to one of the holes 10a of the top arms 10 and bottom bracket 6a of each headlight 6 is connected to one of the holes 11a of the medial arms 11 of the pair of brackets 3. The brackets 5a (only one of the brackets 5a is shown in FIGS. 4A and 4B) of the air intake shroud 5 are connected to the bracket 12a of the bottom arms 12 of the pair of brackets 3. The engine cooling apparatus 4, the pair of headlights 6, and the air intake shroud 5 are connected to the pair of brackets 3 preferably by nuts and bolts. However, the engine cooling apparatus 4, the pair of headlights 6, and the air intake shroud 5 may be connected to the pair of brackets 3 by any other suitable means.

The engine cooling apparatus 4 is attached to the top arms 10 and the bottom arms 12 of the pair of brackets 3 such that it is substantially vertical. Each of the headlights 6 is arranged between the engine cooling apparatus 4 and one of the medial arms 11 of the pair of brackets 3. The air intake shroud 5 is attached to the bottom arms 12 of the pair of brackets 3 so that air is directed to the bottom of the engine cooling apparatus 4 when the ATV is operated. Air is directed to the upper portion of the engine cooling apparatus 4 through the grill 35 in the front fender 26 of the ATV 1, as shown in FIG. 5.

Instead of attaching each of the air intake shroud 5, the pair of headlights 6, and the engine cooling apparatus 4 to the pair of brackets 3, only two of the air intake shroud 5, the pair of headlights 6, and the engine cooling apparatus 4 can be attached to the pair of brackets 3. For example, the engine cooling apparatus 4 and the pair of headlights 6 can be attached to the pair of brackets 3.

The assembly of the air intake shroud 5, the pair of headlights 6, the engine cooling apparatus 4, and the pair of brackets 3 with the body frame can be accomplished by (1) attaching the pair of brackets 3 to the front frame members 2h of the body frame 2, and (2) then attaching the air intake shroud 5, the pair of headlights 6, and the engine cooling apparatus 4. Alternatively, the assembly can be accomplished by (1) attaching the air intake shroud 5, the pair of headlights 6, and the engine cooling apparatus 4 to the pair of brackets 3, and (2) then attaching the assembly of the pair of brackets 3 with the air intake shroud 5, the pair of headlights 6a and 6b, and the engine cooling apparatus 4 to the front frame members 2h of the body frame 2.

With the unique structure and elements described above, the at least one mounting bracket enables at least two or preferably all three of a pair of headlights, an air intake shroud and an engine cooling apparatus to be easily and securely mounted on a vehicle so as to maximize air flow to the air intake shroud and engine cooling apparatus and to maintain an accurate position of the headlights.

It should be understood that the foregoing description is only illustrative of preferred embodiments of the present invention. Various alternatives and modifications can be devised by those skilled in the art without departing from the present invention. Accordingly, the present invention is intended to embrace all such alternatives, modifications and variations which fall within the scope of the appended claims.

What is claimed is:

1. A vehicle comprising:
   a body frame; and
   a pair of brackets connected to the body frame; wherein
   at least two of an air intake shroud, a pair of headlights, and an engine cooling apparatus, are mounted directly to the pair of brackets;
   each of the pair of brackets extends from the body frame toward a front of the vehicle;
   each of the pair of brackets includes at least one arm extending toward the front of the vehicle, the engine cooling apparatus is mounted between the at least one arm of the pair of brackets and each of the pair of headlights is mounted on a respective one of the pair of brackets outside of the engine cooling apparatus; and
   the pair of brackets are connected to each other only by the body frame, the engine cooling apparatus, or the air intake shroud.

2. The vehicle according to claim 1, wherein each of the air intake shroud, the pair of headlights, and the engine cooling apparatus is mounted directly to the pair of brackets.

3. The vehicle according to claim 1, wherein the engine cooling apparatus is mounted at a front portion of the pair of brackets so as to be located at the front of the vehicle.

4. The vehicle according to claim 1, wherein the engine cooling apparatus is mounted on the pair of brackets so as to be substantially vertically arranged in the vehicle.

5. The vehicle according to claim 1, wherein each of the pair of brackets includes:
   a first portion for attachment to the body frame; and
   a second portion attached to the first portion for mounting said at least two of the pair of headlights, the air intake shroud, and the engine cooling apparatus to the pair of brackets, the second portion being located forward of the first portion toward the front of the vehicle.

6. The vehicle according to claim 1, wherein each of the pair of brackets includes top, medial, and bottom arms.

7. The vehicle according to claim 6, wherein the engine cooling apparatus is mounted to the top and bottom arms of the pair of brackets, the air intake shroud is mounted to the bottom arms of the pair of brackets, and each of the headlights is mounted to the top and medial arms of a respective one of the pair of brackets.

8. A method of assembling a vehicle comprising the steps of:
   providing a body frame;
   providing a pair of brackets;
   mounting the pair of brackets to the body frame; and
   fixing at least two of an air intake shroud, a pair of headlights, and an engine cooling apparatus, directly to the at least one bracket; wherein
   the step of providing the pair of brackets includes arranging the pair of brackets such that each of the pair of brackets extends from the body frame toward a front of the vehicle;
   each of the pair of brackets includes at least one arm extending toward the front of the vehicle, the engine cooling apparatus is mounted between the at least one arm of the pair of brackets and the pair of headlights is mounted on the pair of brackets outside of the engine cooling apparatus; and
   the pair of brackets are connected to each other only by the body frame, the engine cooling apparatus, or the air intake shroud.

9. The method according to claim 8, wherein the step of fixing includes fixing each of the pair of headlights, the air intake shroud, and the engine cooling apparatus directly to the pair of brackets.

10. The method according to claim 8, wherein in the step of fixing, the engine cooling apparatus is fixed to the pair of brackets at a front portion thereof so as to be located at the front of the vehicle.

11. The method according to claim 8, wherein in the step of fixing, the engine cooling apparatus is mounted on the pair of brackets so as to be substantially vertically arranged in the vehicle.

12. The method according to claim 8, wherein each of the pair of brackets includes:

a first portion for attachment to the body frame; and a second portion attached to the first portion for mounting said at least two of the pair of headlights, the air intake shroud, and the engine cooling apparatus to the at least one bracket, the second portion being located forward of the first portion toward the front of the vehicle.

13. The method according to claim 8, wherein the step of fixing is performed before the step of mounting.

14. The method according to claim 8, wherein the step of mounting is performed before the step of fixing.

15. The method according to claim 8, wherein each of the pair of brackets includes top, medial, and bottom arms.

16. The method according to claim 15, wherein the engine cooling apparatus is mounted to the top and bottom arms of the pair of brackets, the air intake shroud is mounted to the bottom arms of the pair of brackets, and each of the headlights is mounted to the top and medial arms of a respective one of the pair of brackets.

\* \* \* \* \*